2. MARINE PROPULSION.
PADDLE-WHEELS —
9. Fitting and Driving.
CLASSIFICATION
3112 X
DIVISION.
~~3112X~~
3112 ½ X
115. SHIPS.
2. PROPULSION.
[139] Paddle Wheels.
Barnabas Langdon & John Langdon
Improvement in the Horse Boat.
Vol 4. pg. 229.
Filed June 5th.
June 5, 1819.
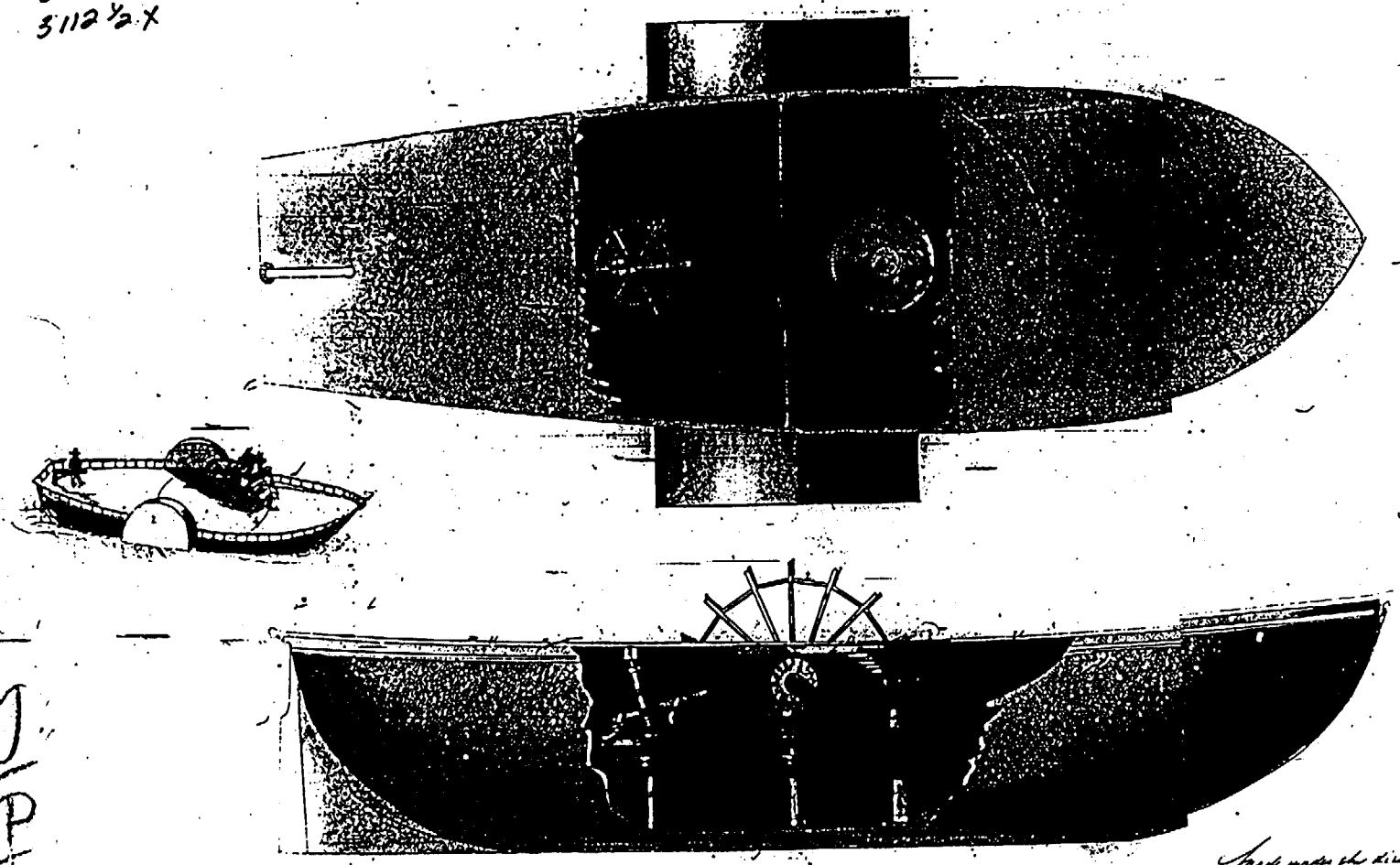
Patent Office June 29 1881.
Struck under the direction of the Commissioner of Pa
in accordance with act of 3d March 1837.
0/P TEMPORARY NOTICE of BEST AVAILABLE IMAGE

U. S. PATENT AND TRADEMARK OFFICE

THE SCANNED IMAGES OF PATENT NUMBER 3112 1/2X FOR THE ISSUE DATE OF 6/5/1819 ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

TEMPORARY NOTICE of BEST AVAILABLE IMAGE